US008620707B1

(12) United States Patent
Belyi et al.

(10) Patent No.: US 8,620,707 B1
(45) Date of Patent: Dec. 31, 2013

(54) SYSTEMS AND METHODS FOR ALLOCATING INVENTORY IN A FULFILLMENT NETWORK

(75) Inventors: Dmitriy Belyi, Seattle, WA (US); Xiao Yu Li, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 88 days.

(21) Appl. No.: 13/172,153

(22) Filed: Jun. 29, 2011

(51) Int. Cl.
*G06Q 10/00* (2012.01)

(52) U.S. Cl.
USPC .......... 705/7.12; 705/7.11; 705/7.23; 705/28; 705/29

(58) Field of Classification Search
USPC ................... 705/7.11–7.42, 28, 29
See application file for complete search history.

(56) References Cited

U.S. PATENT DOCUMENTS

| | | | |
|---|---|---|---|
| 5,395,206 A * | 3/1995 | Cerny, Jr. ...................... 414/807 |
| 5,623,413 A * | 4/1997 | Matheson et al. ............ 701/117 |
| 5,953,707 A * | 9/1999 | Huang et al. ................. 705/7.25 |
| 5,963,919 A * | 10/1999 | Brinkley et al. ............... 705/28 |
| 6,341,269 B1 | 1/2002 | Dulaney et al. |
| 6,834,266 B2 | 12/2004 | Kumar et al. |
| 6,976,001 B1 | 12/2005 | Levanoni et al. |
| 7,236,949 B2 | 6/2007 | Natan et al. |
| 7,289,969 B1 * | 10/2007 | Ballenger et al. .............. 705/28 |
| 7,295,990 B1 * | 11/2007 | Braumoeller et al. ....... 705/7.31 |
| 7,313,532 B2 | 12/2007 | Mariamova et al. |
| 7,370,005 B1 * | 5/2008 | Ham et al. ...................... 705/28 |
| 7,406,435 B2 * | 7/2008 | Aronowich et al. ......... 705/7.31 |
| 7,437,308 B2 | 10/2008 | Kumar et al. |
| 7,437,323 B1 | 10/2008 | Valkov et al. |
| 7,607,577 B1 * | 10/2009 | Yu et al. ........................ 235/383 |
| 7,676,404 B2 | 3/2010 | Richard et al. |
| 7,881,986 B1 * | 2/2011 | Pape et al. ....................... 705/28 |
| 8,000,988 B1 * | 8/2011 | Bezanson et al. ............ 705/7.11 |
| 8,055,520 B2 | 11/2011 | Baumann et al. |
| 8,099,320 B2 * | 1/2012 | Li et al. ........................ 705/7.31 |
| 8,249,917 B1 * | 8/2012 | Kassmann et al. .............. 705/12 |
| 8,321,280 B2 * | 11/2012 | Ma et al. ..................... 705/14.73 |
| 2001/0047293 A1 | 11/2001 | Waller et al. |
| 2002/0072988 A1 | 6/2002 | Aram |
| 2003/0074251 A1 | 4/2003 | Kumar et al. |

(Continued)

OTHER PUBLICATIONS

Oracle Advanced Planning—Implementation and User's Guide, vols. 1 and 2, Release 11i Oracle, May 2003.*

(Continued)

*Primary Examiner* — Alan S Miller
(74) *Attorney, Agent, or Firm* — Robert C. Kowert; Meyertons, Hood, Kivlin, Kowert & Goetzel, P.C.

(57) ABSTRACT

Systems and methods systems and methods for allocating inventory in a fulfillment network are disclosed. In some embodiments, a method may include identifying orders fulfilled by a fulfillment center, where each of the identified orders specifies one or more of a plurality of items. The method may also include determining, for each identified order, a probability that the identified order will occur in the future and calculating, for each identified order, a cost savings. Items may then be selected based, at least in part, upon the determined probability and cost savings of each identified order. Additionally or alternatively, a method may include, for a selected item, receiving a customer demand forecast, determining a bind factor, and calculating a target inventory for the selected item to be stored in the fulfillment center based, at least in part, upon the customer demand forecast and the bind factor.

20 Claims, 7 Drawing Sheets

(56) References Cited

U.S. PATENT DOCUMENTS

| | | | |
|---|---|---|---|
| 2003/0093388 A1* | 5/2003 | Albright | 705/400 |
| 2003/0101107 A1 | 5/2003 | Agarwal et al. | |
| 2003/0177057 A1* | 9/2003 | Aronowich et al. | 705/10 |
| 2003/0195791 A1 | 10/2003 | Waller et al. | |
| 2003/0208392 A1* | 11/2003 | Shekar et al. | 705/8 |
| 2004/0039664 A1 | 2/2004 | Natan et al. | |
| 2004/0148217 A1* | 7/2004 | Lauring et al. | 705/10 |
| 2004/0172341 A1 | 9/2004 | Aoyama et al. | |
| 2005/0144053 A1* | 6/2005 | Mauthe et al. | 705/8 |
| 2006/0224398 A1* | 10/2006 | Lakshman et al. | 705/1 |
| 2007/0143157 A1 | 6/2007 | Sussman et al. | |
| 2007/0192215 A1* | 8/2007 | Taylor et al. | 705/28 |
| 2008/0147486 A1 | 6/2008 | Wu | |
| 2008/0154709 A1* | 6/2008 | Ham et al. | 705/10 |
| 2008/0301009 A1* | 12/2008 | Plaster et al. | 705/28 |
| 2009/0027124 A1 | 1/2009 | Xu | |
| 2009/0187468 A1 | 7/2009 | Krech et al. | |
| 2009/0240544 A1* | 9/2009 | Cheng et al. | 705/8 |
| 2009/0271241 A1 | 10/2009 | Pratt | |
| 2010/0138273 A1 | 6/2010 | Bateni et al. | |
| 2010/0205039 A1 | 8/2010 | Basak et al. | |
| 2010/0241269 A1* | 9/2010 | Ham et al. | 700/214 |
| 2012/0265630 A1* | 10/2012 | McLaughlin et al. | 705/26.1 |
| 2013/0013372 A1* | 1/2013 | Gomez Uribe et al. | 705/7.29 |

OTHER PUBLICATIONS

Oracle Demand Planning—User's Guide, Release 11i Oracle, Jan. 2002.*

Oracle Inventory Users Guide, Release 11i, May 2003.*

Oracle Order Management—User's Guide, Release 11i, Aug. 2002.*

Oracle Sourcing—Implementation and User's Guide, Release 12, Dec. 2006.*

"Integrating the warehousing and transportation functions of the supply chain" Scott J. Mason, P. Mauricio Ribera, Jennifer A. Farris, Randall G. Kirk; Transportation Research Part E 39 (2003) 141-159.*

"A genetic algorithm-based heuristic for the dynamic integrated forward/reverse logistics network for 3PLs"; Hyun Jeung Ko, Gerald W. Evans; Computers & Operations Research 34 (2007) 346-366.*

"Order Fulfillment in Online Retailing: What Goes Where" Ping Josephine Xu; Massachusetts Institute of Technology 2005.*

U.S. Appl. No. 13/524,897, filed Jun. 15, 2012, Fedor Zhdanov, et al.

U.S. Appl. No. 13/172,726, filed Jun. 29, 2011, Jason W. Murray, et al.

U.S. Appl. No. 13/211,158, filed Aug. 16, 2011, Aniket Ajit Prabhune, et al.

U.S. Appl. No. 13/172,733, filed Jun. 29, 2011, Eric M Mack, et al.

Benjamin W. Wah and Tao Wang, "Simulated Annealing with Asymptotic Convergence for Nonlinear Constrained Global Optimization," 2004, pp. 1-15.

Benjamin W. Wah, et al "Hybrid Constrained Simulated Annealing and Genetic Algorithms for Nonlinear Constrained Optimization" 2001, pp. 1-8.

Benjamin W Wah, et al, "The Theory of Discrete Lagrange Multipliers for Nonlinear Discrete Optimization" Research supported by National Science Foundation Grant NSF MIP 96-32316. Principles and Practice of Constraint Programming, Springer-Verlag, Oct. 1999, pp. 28-42.

Benjamin W Wah, et al, "Constrained Genetic Algorithms and their Applications in Nonlinear Constrained Optimization" Proceedings of the 12th International Conference on Tools with Artificial Intelligence Nov. 2000, pp. 1-8.

Benjamin W Wah, et al "Simulated annealing with asymptotic convergence for nonlinear constrained optimization" Received Aug. 20, 2005, accepted Oct. 16, 2006, Springer Science and Business Media BV 2006, pp. 1-37.

Zhe Wu "The Theory and Applications of Discrete Constrained Optimization Using Lagrange Multipliers" 2000, pp. 1-221.

U.S. Appl. No. 12/981,382, filed Dec. 29, 2010, Maomao Chen.

* cited by examiner

```
while (count < ITEM_LIMIT){ for each ITEM in the set of ALL_ITEMS {
```

$$\text{benefit\_ITEM} \;=\; \sum_{ususe d\_f} \frac{c_i f(ITEM,...,y_i)1}{K_j} + \sum_{1\_used\_ITEM} \frac{c_i f(ITEM,...,y_i)2}{K_j} + ...;$$

```
        if (benefit_ITEM > max_benefit){ best_ITEM = ITEM;

max_benefit = benfit_ITEM;

order_list = ITEM_order_list;

}

} store best_ITEM in SELECTED_ITEMS_LIST; count++; update
"Unused", "1 Used" , etc.;

} return SELECTED_ITEMS_LIST;
```

SYSTEMS AND METHODS FOR ALLOCATING INVENTORY IN A FULFILLMENT NETWORK

BACKGROUND

To offer customers a wide variety of products that are readily available for delivery, a merchant (whether engaging in electronic or conventional "brick and mortar" commerce) may store those products in warehouses, fulfillment centers, or other inventory facilities. Keeping products in inventory may serve to attenuate variations in customer demand and/or in a manufacturer or distributor's ability to supply those products. For example, in some cases, different products offered for sale by a merchant may have different manufacturer lead times, and holding certain quantities of those products "in stock" may enable a merchant to make such products available to customers in a more consistent fashion.

Generally speaking, when a merchant operates a fulfillment network that includes geographically distributed fulfillment centers, the same product may be stocked in two or more of those fulfillment centers. As such, when an order for that product is received by the merchant, the merchant may select one of its various fulfillment centers to fulfill the order. In most cases, the merchant may simply use the fulfillment center that is closest to the delivery address specified in the order in an attempt to reduce shipping costs from the fulfillment center to the customer.

In order to allocate the available inventory across its fulfillment network so that each fulfillment center may be stocked in a manner that is appropriate for its corresponding geographic region, a merchant may determine a demand forecast for products in those regions. Once the demand for a given product is known in each region, the merchant may then distribute the available quantities of that product (e.g., from a distribution center or hub, directly from vendors, etc.) to each fulfillment center in amounts that are proportional to their respective demand forecasts.

BRIEF DESCRIPTION OF THE DRAWINGS

FIG. 5 is a pseudo-code algorithm for selecting items to be stored in a fulfillment center according to some embodiments.

Figure 1:
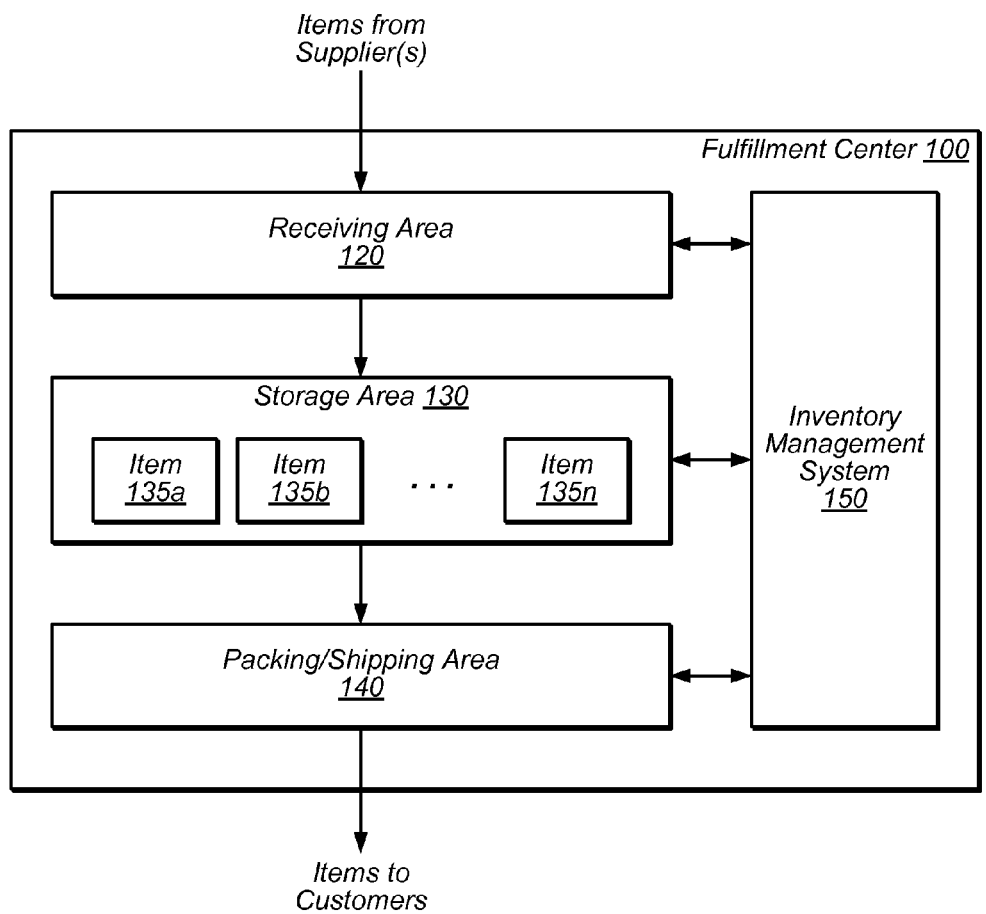
FIG. 1 is a block diagram of a fulfillment center according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of systems and methods for allocating inventory in a fulfillment network are disclosed. In some embodiments, a merchant may operate a plurality of fulfillment centers that carry a plurality of items in stock. To allocate or distribute items across its fulfillment centers, certain items may be selected, for instance, based on a probability of future customer orders and/or a cost savings associated with those orders. In some cases, the probability of future customer orders and/or cost savings may be determined for each individual fulfillment center. For example, the probability of future orders may be determined from orders previously fulfilled by a given fulfillment center, and cost savings may be determined based on economic benefits achieved by having fulfilled those orders from that fulfillment center (as opposed to another fulfillment center, for example). A limited number of different items may be specified for a particular fulfillment center, and items to store in that fulfillment center up to the limited number may be selected to maximize the cost savings for the limited number of distinct items. In some embodiments, once items have been selected for distribution to a given fulfillment center, the merchant may also calculate quantities of each such item to be stored in that fulfillment center. These quantities may be determined, for instance, based at least in part on a "bind factor" and a customer demand forecast for the item in a geographic region served by the fulfillment center. For example, in some cases, the bind factor may be derived from past orders and/or inventory data associated with the fulfillment center.

In some embodiments, a method may include identifying orders fulfilled by a fulfillment center during a previous time period, where each of the identified orders specifies one or more of a plurality of items. The method may also include determining, for each identified order, a probability that the identified order will occur in a subsequent time period. The method may further include calculating, for each identified order, a cost savings associated with having fulfilled the identified order from the fulfillment center instead of another fulfillment center during the previous time period. The method may also include selecting items among the plurality of items to be stored in the fulfillment center during at least a portion of the subsequent time period based, at least in part, upon the determined probability and cost savings of each identified order to maximize the cost savings for the limited number of distinct items.

Additionally or alternatively, a method may include, for each selected item, receiving a customer demand forecast corresponding to the selected item, determining a bind factor for the selected item, and calculating a target inventory level for the selected item to be stored in the fulfillment center based, at least in part, upon the customer demand forecast and the bind factor.

In other embodiments, a system may include at least one processor and a memory coupled to the at least one processor, where the memory stores program instructions, and where the program instructions are executable by the at least one processor to cause the system to perform one or more of the operations described herein. In yet other embodiments, a tangible computer-readable storage medium has program instructions stored thereon that, upon execution by a computer system, may cause the computer system to perform one or more of the foregoing operations described herein.

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (i.e., "brick-and-mortar") store, through which customers may receive information about products and order or purchase those products in person.

As used herein, the term "customer" includes any purchaser (or potential purchaser) of an item or product, including entities other than an end consumer of a product sold. Therefore, manufacturers, distributors, retailers, and consumers may be "merchants" and/or "customers" depending upon their position within the supply chain. It is noted that in some embodiments, a unit of an item may be rented, leased or licensed to a customer under specific terms in exchange for revenue or other economic consideration.

As used herein, the term "sale" includes any suitable transaction involving an item resulting in either direct or indirect (e.g., imputed or tangential) revenue, and is intended to encompass rentals, leases, subscriptions, licenses, and other types of revenue models.

As used herein, the term "fulfillment center" includes any inventory storage facility including, for example, warehouses, repositories, depositories, stockrooms, storehouses, distribution centers, material handling facilities, or the like.

Fulfillment Systems

In order to offer a wide variety of items that are readily available for delivery, a merchant may store various quantities of such items within one or more geographically distributed fulfillment centers. An embodiment of one such fulfillment center is shown in FIG. 1 by way of a non-limiting example. As illustrated, fulfillment center 100 includes receiving area 120, storage area 130 configured to store an arbitrary number of items or products 135a-n, and packing/shipping area 140. The arrangement of the various areas within the illustrated embodiment of fulfillment center 100 is depicted functionally rather than schematically. For example, in some embodiments, it is noted that multiple different receiving areas 120, storage areas 130, and packing/shipping areas 140 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of items 135 from various suppliers and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135' may be received from one or more suppliers, such as manufacturers, distributors, wholesalers, etc. at receiving area 120. Some fulfillment centers may receive certain items, or all items, only from other fulfillment centers within a fulfillment network. For such fulfillment centers there may be an additional distribution cost associated with getting items to that fulfillment center. However, such fulfillment centers may be located close to major population areas to lower shipping cost and enable fast order fulfillment. In various embodiments, items 135 may include merchandise, commodities, perishables, or any suitable type of item depending on the nature of the merchant or enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some embodiments, like items 135 may be stored together in bins, on shelves or via other suitable storage mechanisms, such that all items 135 of a given kind are stored in one location. For example, items having a common Universal Product Code (UPC), Stock-Keeping Unit (SKU) code, or other designation (including proprietary designations) may be stored together. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for shipment to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

Management of items 135 stored as inventory within fulfillment center 100 often presents complex optimization problems. Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

On the other hand, various costs are typically associated with storing items 135 in fulfillment center 100 for any period of time. In some embodiments, holding a unit of an item 135 in storage within storage area 130 may incur incremental storage costs. For example, the cost of providing fulfillment center 100 in which items 135 may be stored may include recurring real estate costs (e.g., lease costs, debt service, etc.), personnel costs, facilities costs (e.g., utilities, maintenance, etc.) and any other costs associated with fulfillment center 100. In addition to storage costs, in some embodiments, holding a unit of an item 135 in storage may incur capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. Also, over time, items 135 may depreciate, expire, spoil or become obsolete, which may also be expressed as part of a cost of holding such items 135. At least in part to avoid or minimize some of these various costs, it is common practice for a merchant to fulfill existing orders for items 135 as soon as those orders are received and processed.

A merchant that deals with customers on a large scale may not adequately meet its business goals with only a single fulfillment center 100. For example, a merchant that deals in many different types of items 135 and/or that services customers in a large geographical area may find it impractical to keep its entire inventory in a single facility. In some instances, a merchant that faces the challenge of scaling its inventory and fulfillment handling capabilities may choose to deploy a more complex fulfillment network. In those instances, a merchant's fulfillment network may include a plurality of geographically distributed fulfillment centers. Although any fulfillment center may generally be capable of fulfilling any order received by the merchant, each fulfillment center may also be assigned its own fulfillment region. In this manner, when an order specifies a delivery address within a given region, the order may ordinarily be fulfilled from the given region's respective fulfillment center. To address challenges involved in managing such a complex network, the merchant may implement an order fulfillment and inventory planning system or the like.

Figure 2:
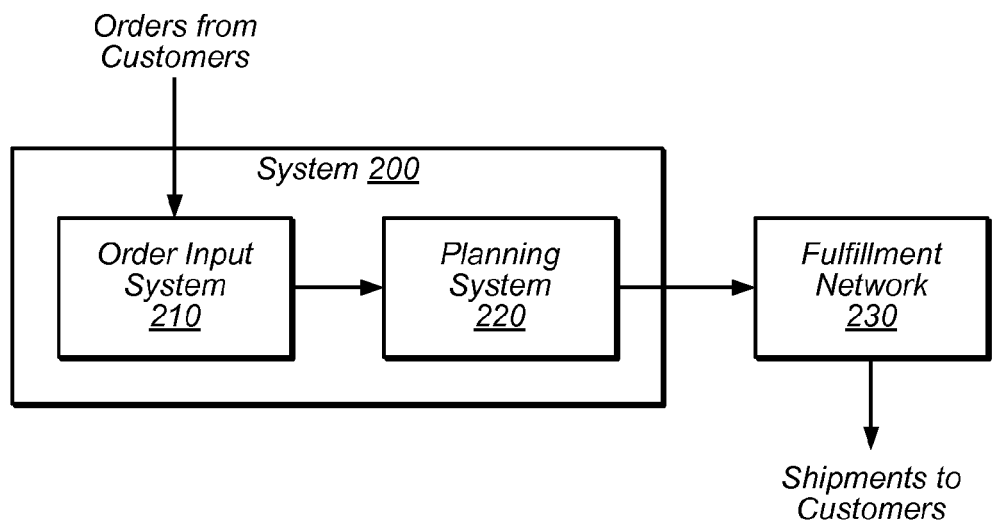
FIG. 2 is a block diagram illustrating an embodiment of a system configured to receive customer orders and perform planning operations according to some embodiments.

FIG. 2 illustrates an embodiment of a system configured to receive customer orders and perform fulfillment and inventory planning according to some embodiments. Specifically, system 200 may be configured to receive customer orders for items 135, determine how customer orders should be assigned to the resources of network 230 for fulfillment, and dispatch instructions to the assigned resources of network 230 in order to effect shipment of customer orders. In the illustrated embodiment, system 200 includes an order input system 210 that is configured to communicate with a planning system 220, which is in turn configured to communicate with network 230.

Generally speaking, order input system 210 may be configured to receive orders placed by customers for various items 135 offered by the merchant. In some embodiments, order input system 210 may be configured to implement an electronic commerce (e-commerce) portal, such as a web-based interface through which customers may browse items 135, select items 135 for ordering, and supply details regarding orders (e.g., payment information, shipping address information, etc.). In other embodiments, order input system 210 may be configured to implement an order entry interface that is not presented to the customer directly, but which is instead employed by an agent (e.g., a salesperson, customer service representative, etc.) to input order information on behalf of a customer.

Planning system 220 may generally be configured to receive incoming orders received by the merchant via order input system 210 and to analyze customer orders to determine how they should be assigned to various fulfillment centers of network 230 for fulfillment. For example, if a given customer orders five distinct items 135, it may be possible to ship all of the ordered items 135 from a single fulfillment center 100. However, it may also be possible to divide the given customer's order for fulfillment by multiple different fulfillment centers 100. As discussed below, numerous different variables and constraints may be taken into account by planning system 220 when generating a fulfillment plan for an order, such as the costs associated with various plans, the promises made to the customer regarding shipping or arrival dates, or other factors.

After identifying the fulfillment plan that should be executed for a particular order, planning system 220 may be configured to communicate instructions to network 230 in order to realize the plan. For example, planning system 220 may interact with the inventory management system 150 of a fulfillment center 100 corresponding to a particular fulfillment center to instruct that certain items 135 of a particular order should be picked, packed, and shipped to the customer for the particular order. Alternatively, planning system 220 may interact with a drop shipper, such as a third party merchant or distributor, to instruct that certain items 135 of a particular order should be shipped to the customer. In various embodiments, communication of fulfillment instructions that are needed to implement a particular fulfillment plan to the various fulfillment centers 100 within network 230 may occur according to any suitable technique. For example, planning system 220 may be configured to exchange messages with systems within a particular fulfillment center using web-based protocols (e.g., Hypertext Transfer Protocol (HTTP), eXtensible Markup Language (XML), or other suitable protocols) conveyed via the public Internet, a private intranet, Virtual Private Networks, or another suitable networking scheme or combination of these. Communication between planning system 220 and fulfillment centers may also be implemented using electronic mail or other messaging techniques, analog or digital telephony, or any other wired or wireless data transfer technique, either using standard or proprietary protocols.

In various embodiments, order input system 210 and planning system 220 may be implemented as respective dedicated computer systems, or they may be implemented as computer-executable instructions and data that may be executed by one or more computer systems (e.g., as described in greater detail below with respect to FIG. 5). Systems 210 and 220 are discussed and shown as separate systems in order to facilitate their description; however, in some embodiments, the functions of these systems may be integrated into and implemented by a single computer system or set of computer-executable instructions. Alternatively, the functionality of systems 210 and 220 may be partitioned differently than is shown in FIG. 2. For example, some functions of these systems may be assigned to or subsumed within the operation of other systems.

It is also contemplated that order input system 210 and/or planning system 220 may interact with or implement various features of a number of other features not shown. For example, in one embodiment, order input system 210 may be configured to interact with accounting and billing systems in order to collect customer payments and update enterprise financial records to reflect the effects of transactions. In one embodiment, planning system 220 may be configured to interact with additional systems that track the current state of inventory within network 230 and/or predict its future state (e.g., by predicting lead time for various items 135, accounting for items 135 that are inbound to network 230 but not yet received by fulfillment centers, or analyzing or predicting other network state variables). Planning system 220 may also interact with other systems that model or estimate variables that may influence the planning process, such as the expected transit time for shipping from a particular fulfillment center to a customer via a particular carrier and/or shipping method.

In addition to, or separately from, performing order fulfillment operations, planning system 220 may be configured to allocate and/or distribute inventory across the various fulfillment centers 100 of network 230. For example, a user may provide planning system 220 with an indication of a quantity of an item that has arrived (or is expected to arrive) at a distribution center or hub within network 230. Additionally or alternatively, the user may provide planning system 220 with an indication of a quantity of an item that is available for distribution directly from a manufacturer, supplier, vendor, etc. to fulfillment centers 100 of network 230. In response, planning system 200 may determine how to allocate or distribute those items across the merchant's various fulfillment centers 100.

For example, in some cases, planning system 220 may determine that a particular item is not expected to ship from a given fulfillment center (i.e., there is no customer demand for the item in the fulfillment center's respective region), and that this particular fulfillment center therefore should not receive any quantities of that item. More generally, to the extent that two or more fulfillment centers may be expected to ship different quantities of an item in the future, the total available quantity may be distributed between those two or more fulfillment centers in a manner proportional to each fulfillment center's future shipping expectations. In order words, a target inventory level (TIL) may be computed for each fulfillment center by simply multiplying a regional demand forecast by a desired time period (e.g., days of cover, etc.).

The foregoing inventory allocation or distribution technique assumes that, as long as there is demand for a given item in a fulfillment's center local geographic region, and as long as there is sufficient local inventory to meet that demand, it would be most beneficial to fulfill incoming orders (that specify delivery addresses within the local region) from the local fulfillment center. Consider, however, a situation where fulfillment network 230 has two different items A and B, but only item A is present in stock at a local fulfillment center, and both items A and B are present in stock at a more distant fulfillment center (more distant with respect to the order's delivery address). If an incoming order selects both items A and B to be delivered to an address served by the local fulfillment center (i.e., within a local region), the order may nonetheless be fulfilled by the more distant fulfillment center in order to avoid costs associated with "splitting" fulfillment among different fulfillment centers. Assume, for example, that 90% of the time when item A is ordered, it is ordered together with item B. In that case, if the local fulfillment center has a full supply of A (i.e., a supply sufficient to meet the entire demand of item A in the local region) but a limited supply of B (e.g., due to capacity constraints, etc.), then up to 90% of orders of item A in the local region may be fulfilled from a more distance fulfillment center, and up to 90% of the supply of A in the local fulfillment center may be used in a sub-optimal manner.

More generally, it has been observed that, for any given item, some proportion of demand located in a given fulfillment center's local region may not be optimally fulfilled from that fulfillment center, even if the fulfillment center has ample inventory of the item. This may be due to various reasons such as, for example, the presence of other items in the same orders, selected ship options, etc. Thus, in some embodiments, inventory placement techniques disclosed herein may be implemented to allocate or distribute items that tend to be ordered together, so as to increase the chances of optimal local fulfillment from the fulfillment center, as well as to scale the inventory level at the fulfillment center in accordance to the proportion of local demand that would be optimally fulfilled from elsewhere.

Figure 3:
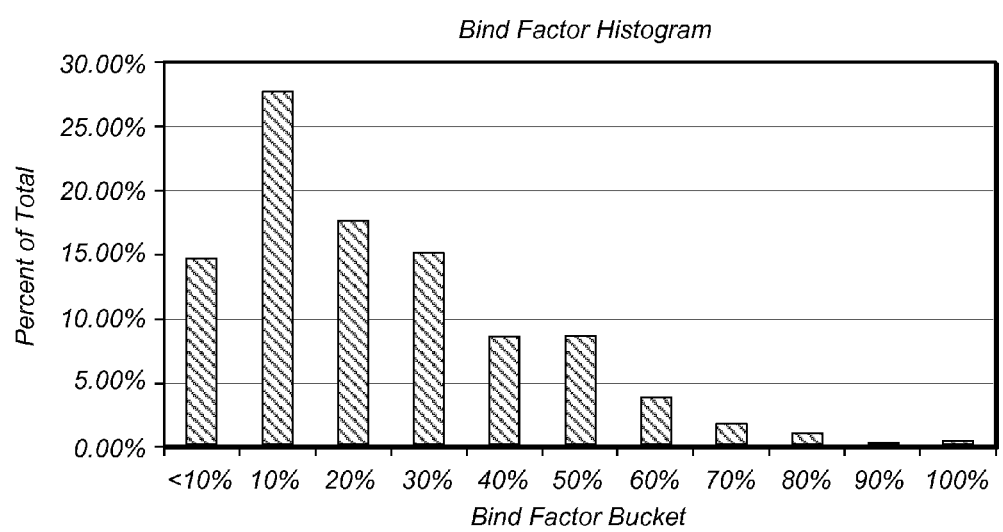
FIG. 3 is a bind factor histogram for various items according to some embodiments.

Turning now to FIG. 3, a "bind factor" histogram for various items is depicted according to some embodiments. The bind factor corresponds to how well an item is selling from a particular fulfillment center. The bind factor for a particular item and for a particular fulfillment center may indicate for a particular time period how much of an item is fulfilled from the fulfillment center to destinations within a geographic area or region assigned to that fulfillment center compared to the quantity of the item that was sent as inventory to that fulfillment center during the particular time period. It may be noted that, overall, the bind factor distribution is skewed to the right, with a mode in the 10-20% range. For example, FIG. 3 illustrates a case in which for about 28% of items stocked to a particular fulfillment center, only 10% of those items were actually fulfilled from that fulfillment center. This likely indicates that a large percentage of those items shipped together with other items that were not stocked in this fulfillment center, and thus the shipments were sent from other fulfillment centers. Overall, factors that may contribute to the quality of the bind factor at a given fulfillment center may include one or more of: the item's tendency to be ordered or shipped as a single item, its ship options, its velocity (i.e., the speed at which inventory is consumed or depleted), its price, its availability at other fulfillment centers, the availability of other items that tend to ship with it from the fulfillment center, etc.

In some embodiments, in order to allocate and/or distribute inventory across its various fulfillment centers, a merchant may implement techniques for selecting a set of items to be stored in a given fulfillment center and for calculating quantities of those items. In some cases, these two techniques may be performed independently of each other. In other cases, these techniques may be performed in connection with each other. For example, in a first operation, planning system 220 may select or identify items for distribution to a given fulfillment center. The selection process may take into account mutual affinities among the various products. Once those items are selected, planning system 220 may, in a second operation, determine how many of those selected items should be distributed to that fulfillment center. In some embodiments, the number of items and/or the quantities of each item may be subject to different constraints. Therefore, in some cases, the selection of items and calculation of quantities may be repeated in order to meet those constraints. These various techniques are discussed in turn below. Note that "item" as used herein refers to a distinct items, such as identified by stock-keeping unit (SKU) number, item type, or other item identifier. The techniques described herein selects items to be stocked or stored at a particular fulfillment center, and then separately determines quantities of each selected item to stock or store at the fulfillment center.

Affinity-Based Item Selection

Consider an order specifying a delivery address in a geographic area (i.e., a local region) assigned to a given fulfillment center (i.e., a local fulfillment center). The order may be modeled as a random discrete variable V, with probability mass function (pmf) f. Assume that $x_0, x_1, \ldots, x_N$ represent all N possible items (e.g., items A, B, C, . . . ), and that $y_1, y_2, \ldots, y_M$ represent all M possible ship or delivery options (e.g., standard shipping, two-day delivery, same-day delivery, etc.). As such, the probability of an order with items in vector x, with ship option y, is then given by f(x, y).

For sake of explanation, suppose a hypothetical scenario where a merchant's customers only place four possible orders with equal probability: a first possible order with 1 unit of $x_1$, 1 unit of $x_2$, and 3 units of $x_3$ with ship option $y_1$, a second possible order of 1 unit of $x_1$ with ship option $y_1$, a third possible order of 2 units of $x_1$ with ship option $y_1$, and a fourth possible order of 1 unit of $x_2$ and 2 units of $x_3$ with ship option y2. The pmf may then be expressed as:

$$f(x_1, x_2, x_3, y_1) = \frac{1}{4}$$

$$f(x_2, x_3, y_1) = \frac{1}{4}$$

$$f(x_1, y_1) = \frac{2}{4} = \frac{1}{2}$$

In the embodiment illustrated above, the pmf does not take into account the quantity of an item within an order, although other variations are contemplated. Now, assume that $C_1, C_2, \ldots, C_M$ represent the expected financial savings of shipping an order to a local address from a local fulfillment center (as opposed to shipping it from another, more distant fulfillment center) for different shipping or delivery options M. Also, let J denote the set of all possible order types (i.e., the support of f), and let $K_j$ denote the set of items in a particular realization j. It follows that, to optimize the expected benefit of item selection, items may be selected to maximize:

$$\max\left(\sum_{i=1}^{M} c_i \sum_{j=1}^{|J|} f_j z_j\right) \quad (1)$$

Subject to $z_j \leq x_k$, $\forall k \in K_j$, $\forall j \in J$, where:

$$\sum_{h=1}^{N} x_h \leq ItemLimit \quad (2)$$

and $$x \in \{0,1\}, \forall x \quad (3)$$

In the equations above, (1) ensures that all items from an order are selected and (2) ensures that that the total number of items chosen is less than a pre-defined limit. The decision variables are x (i.e., which items to choose). Also, (3) enforces that each x be binary (i.e., either 0 or 1). Thus, the solution to equation (1) with the given constraints is selection of a limited set of items to stock in the particular fulfillment center that maximizes the cost savings.

Continuing with the hypothetical scenario described above, it is apparent that there are 2 ship options $y_1$ and $y_2$, therefore there are 2 expected ship option savings, $c_1$ and $c_2$. Again, there are 3 items $x_1$, $x_2$, and $x_3$. Suppose the merchant would like to select only 2 of the 3 items (i.e., ItemLimit is 2). The formulation then becomes:

$$\max\left(c_1 z_1 \frac{1}{4} + c_2 z_2 \frac{1}{4} + c_1 z_3 \frac{1}{2}\right)$$

y.t. $z_1 \leq x_2$ $z_1 \leq x_2$ $z_1 \leq x_3$ $z_2 \leq x_2$ $z_2 \leq x_3$ $z_3 \leq x_1$ $x_1 + x_2 + x_3 \leq 2$ $x_1, x_2, x_3$ binary Assume that the expected ship option benefits $c_1=1$ and $c_2=5$. In this case, planning system 220 may find an optimal solution to be $x_1=0$, $x_2=1$, $x_3=1$, which gives the total benefit of 1.25. Accordingly, planning system 220 may determine that the fulfillment center receive the items represented by $x_2$ and $x_3$. It should be noted that, in this case, planning system 220 may not select the item represented by $x_1$, even though it is present in 75% of possible order types.

In some embodiments, $f_j$ may be obtained from historical order or fulfillment data for a specified time period. For example, if there are 200 million orders over some time period, there will be at most 200 million $f_j$, but most likely there would be much less. In some embodiments, $f_j$ may be determined independent of forecasted demand such that the selection of which items to stock in the particular fulfillment center may be made independent of demand. Additionally or alternatively, certain types of orders (e.g., non-sortable items, items that cannot be stored at a given fulfillment center, etc.) may be excluded (e.g., treated as unavoidable "splits").

Moreover, monetary benefits "c" may also be calculated using historical data. For example, for a given ship option, benefit c may include the expected savings of fulfilling from a particular fulfillment center:

c≈Average(ShippingCost$_{non-local}$)−Average(Cost$_{local}$)+Average(UnitsperOrder)*Average(DistributionCost)

ShippingCost$_{non-local}$ may be the cost of shipping orders including a particular item to a destination assigned to the particular fulfillment center from another fulfillment center. Cost$_{local}$ may be the cost for shipping orders including the particular item to a destination assigned to the particular fulfillment center from the particular fulfillment center. DistributionCost may be the additional cost of distributing the particular item to the particular fulfillment center relative to other fulfillment centers. Additionally or alternatively, c may be chosen to reflect other benefits a merchant would (e.g., the benefit of having a certain item available close to customers regardless of demand, difference in inventory costs for different fulfillment centers, an intangible benefit, etc.).

Figure 4:
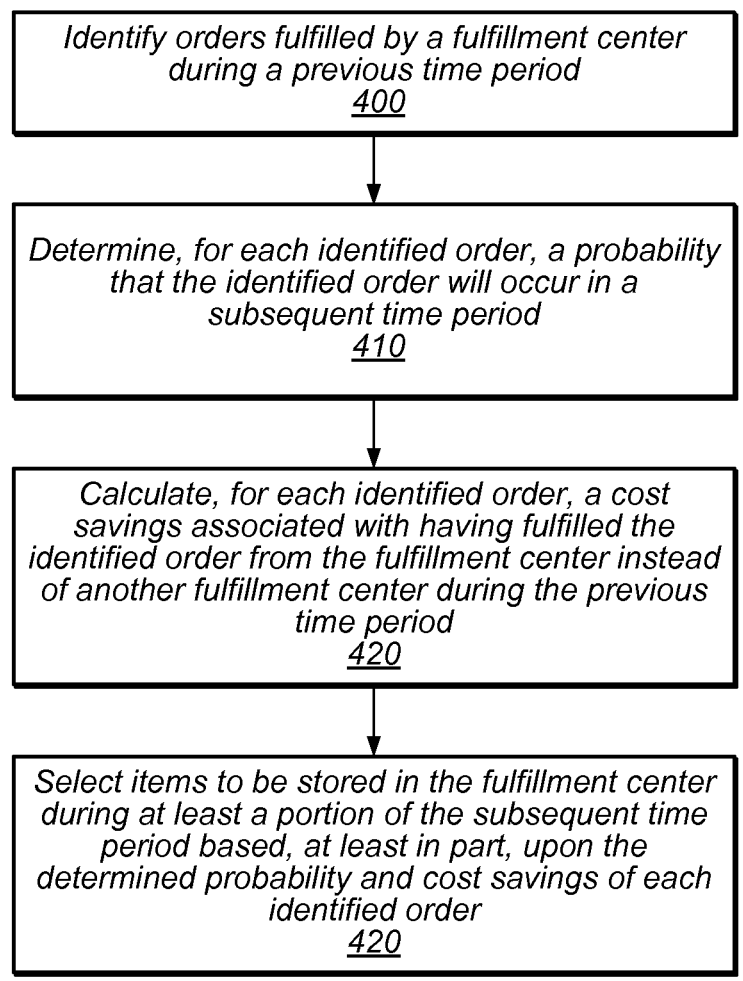
FIG. 4 is a flow diagram of a method for selecting items to be stored in a fulfillment center according to some embodiments.

To summarize the foregoing, FIG. 4 shows a flow diagram of a method for selecting items to be stored in a given fulfillment center according to some embodiments. This method may be implemented, for example, by planning system 220 shown in FIG. 2, or by a separate system. At block 400, the method may identify orders fulfilled by a fulfillment center during a previous time period, for instance, based on historical order or fulfillment data. At block 410, the method may determine, for each identified order, a probability that the identified order will occur in a subsequent time period (e.g., in the future). At block 420, the method may calculate, for each identified order, a cost savings associated with having fulfilled the identified order from the fulfillment center instead of another, more distant fulfillment center, during the same time period. Then, at block 430, the method may select items to be stored in the fulfillment center during at least a portion of the subsequent time period based, at least in part, upon the determined probability and cost savings of each identified order.

In some embodiments, to perform the operations of block 430 and/or to solve equations (1)-(3) set forth above, a numerical approximation may be used. For example, an algorithm such as the one shown in FIG. 5 in the form of pseudo-code may approximate the benefit of adding each item to a fulfillment center and iteratively add items to a list ("order_list") until it reaches an ItemLimit constraint.

As illustrated, algorithm 500 may initially store all $f_j$s in an "unused" data structure. Then, algorithm 500 may go through all of the items and pick the item with the largest approximated benefit according to:

$$\text{benefit}_{ITEM} = \sum_{ususedf} \frac{c_i f(\text{ITEM}, \ldots, y_i)1}{K_j}$$

Where K is the number of items in the order profile $f_j$. If there are N items and M order profiles, this may be achieved in N*M operations. The item with the largest gain, as well as the $f_j$s that contain this item, may be stored at each iteration. After picking the item with the largest gain, it may be removed from the item list, and all orders containing this item may be placed into a new structure (e.g., "1_used_ITEM"), which takes O(M) operations. Algorithm 500 may then search for the next best item; however, this time the benefit may be given by:

$$\text{benefit}_{ITEM} = \sum_{ususedf} \frac{c_i f(\text{ITEM}, \ldots, y_i)1}{K_j} + \sum_{1\_used\_ITEM} \frac{c_i f(\text{ITEM}, \ldots, y_i)2}{K_j}$$

The second iteration may be done in O(N*M) operations. As illustrated above, additional credit or weight (i.e., a factor of "2") may be given the second item for completing a part of an $f_j$ that already contains the first item. In some cases, the additional credit given to subsequent items may be any suitable value configured by the user. Algorithm 500 may again sweep through the historical orders, and move the used orders from "Unused" into "1_used_ITEM", and from "1_used_ITEM" to a new structure "2_used_ITEMs." Overall, the same number of orders may be stored, but broken up across different structures. This, again, may be performed in O(M) operations. Algorithm 500 may then be continued until the ItemLimit constraint is reached. As a result, the entire algorithm may execute in O(N*(N*M+M))=O(N²M), which is polynomial in terms of N and M.

Returning to the hypothetical scenario discussed above, in the first sweep through the available items, algorithm 500 may compute the individual benefits of all the items as follows:

$$\text{benefit}_{x_1} = \sum_{ususedf} \frac{c_i f(\text{ITEM}, \ldots, y_i)1}{K} =$$

$$1 * \frac{1}{4} * \frac{1}{3} + 1 * \frac{1}{2} * \frac{1}{1} = 0.58$$

$$\text{benefit}_{x_2} = 1 * \frac{1}{4} * \frac{1}{3} + 5 * \frac{1}{4} * \frac{1}{2} = 0.71$$

$$\text{benefit}_{x_3} = 1 * \frac{1}{4} * \frac{1}{3} + 5 * \frac{1}{4} * \frac{1}{2} = 0.71$$

The highest ranking item are $x_2$ and $x_3$, followed by $x_1$. Suppose the we break ties randomly, and select $x_2$ first. We then move the orders containing $x_2$ into the "1_used_ITEM" bin. We have one more item that we can select (because ItemLimit in this case is 2), so algorithm 500 passes through the orders again:

$$\text{benefit}_{x_1} = \sum_{ususedf} \frac{c_i f(\text{ITEM}, \ldots, y_i)1}{K} +$$

$$\sum_{1\_used\_ITEM} \frac{c_i f(\text{ITEM}, \ldots, y_i)2}{K}$$

$$= 1 * \frac{1}{2} * 1 + 1 * \frac{1}{4} * \frac{2}{3} = 0.67$$

$$\text{benefit}_{x_3} = 1 * \frac{1}{4} * \frac{2}{3} + 5 * \frac{1}{4} * \frac{2}{2} = 1.42$$

Accordingly, algorithm 500 may select $x_3$, as it has a higher benefit than $x_1$. Since the algorithm has reached the ItemLimit constraint, the selected list of items may then be returned to the user. This yields the solution $x_1=0$, $x_2=1$, $x_3=1$.

Inventory Quantities

In some embodiments, given a set of items that have been selected or allocated for storage in a fulfillment center, planning system 220 may calculate quantities of each of those items to be stored in the fulfillment center in the form of a target inventory level (TIL). Specifically, in some cases, a TIL may be given by:

TIL=demand*bind_factor

Where 0≤bind_factor≤1. In some embodiments, "demand" may be the regional customer demand forecast for a geographic region corresponding to a given fulfillment center. Further, the demand may be given as a probability distribution, which may be integrated for a particular time period to yield that total demand for that period. The region, and the demand for that region, may be assigned to a particular fulfillment center; however, not all of the demand for that region will necessarily be fulfilled from that particular fulfillment center. For example, an order to be delivered to the assigned region that includes an item stored at the particular fulfillment center but also including an item not stored at the particular fulfillment center may be fulfilled from a different fulfillment center to avoid the cost of two separate shipments. In contrast with other approaches that may calculate a TIL based only on the customer demand forecast, here the "bind_factor" may reduce the TIL for a specific item, thus resulting in more physical space in trucks and warehouses for other items that would not have otherwise been allocated to the fulfillment center. Applying a bind factor to determine TIL may help adjust for demand that is not fulfilled from the fulfillment center for the assigned region, and thus avoid over-stocking the item at that fulfillment center.

In some cases, after items are selected (e.g., using the affinity-based item selection techniques described above), capacity constraints may prevent all selected items from entering a particular fulfillment center. Accordingly, in some embodiments, items may be ranked as follows:

$$\text{Rank} = \frac{TIL}{CurrentInventoryLevel + 1}.$$

Where "CurrentInventoryLevel" is a number of units of the item presently stored in inventory. For items that bind poorly, multiplying TIL by a low bind factor may decrease that item's ranking, thus reducing the quantities of that item that are allocated to a given fulfillment center.

Generally speaking, explicitly computing optimal bind factors can be a difficult task, because the optimal inventory level for a given item is a function of every other item that may possibly be fulfilled from the fulfillment center, as well as a number of other factors. In some embodiments, rather than explicitly computing bind factors, such factors may be estimated them using a historical bind factor approach. For example, the bind factor of an item at a given fulfillment center may be calculated over some previous time period, and used it as the items bind factor for a future time period. Specifically, for a particular item, its bind factor may be based on the number of units during a given previous time period that were fulfilled locally (i.e., to the region assign to the fulfillment center compared to the quantity of inventory of the item at the fulfillment center during that time period, such as given by:

$$BindFactor = \frac{\#\_of\_units\_fulfilled\_locally}{total\_local\_inventory}$$

For example, if the merchant considers a 2-month historical period, and determines that there were 10 units off item A at some fulfillment center, and the fulfillment center fulfilled 5 local individual demands for item A, the item's Bind Factor may be approximated as 5/10 or 0.5. As a result, if the merchant later receives or identifies a demand of 20 items A in that region, the TIL may be calculated as 10 units (i.e., 20*0.5=10). It should be noted that this approach may provide dynamic flexibility in that bind factors may be re-calculated at any point using any amount of historical data. In other embodiments, other methods may be used to determine the bind factor. For example, a regression model may be used to predict the bind factor based on statistical correlation of various item characteristics and other fulfillment factors to the historical bind factor, such as product group for the item, sales velocity of the item, item size, shipping options used for the item and their cost, etc. Historical data may be used to train a regression model to predict a bind factor for an item in a future time period. In general, any suitable statistical model based on various item characteristics and/or fulfillment factors may be used to predict the bind factor.

Figure 6:
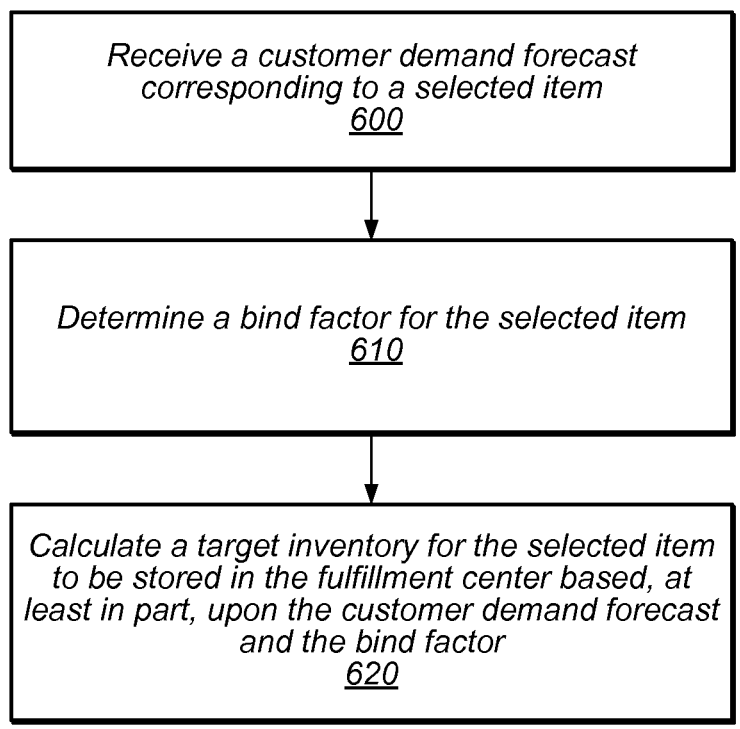
FIG. 6 is a flow diagram of a method for selecting a quantity of an item to be stored in a fulfillment center according to some embodiments.

Referring to FIG. 6, a flow diagram of a method for selecting a quantity of a particular item to be stored in a given fulfillment center is depicted according to some embodiments. Similarly as described with respect to FIG. 5, the method of FIG. 6 may be performed by planning system 220 of FIG. 2, or by a separate system. At block 600, the method may receive a customer demand forecast corresponding to a selected item. At block 610, the method may determine a bind factor for the selected item. And at block 620, the method may calculate a target inventory level for the selected time based, at least in part, upon the customer demand forecast and the bind factor as described above.

In various embodiments described herein, a goal-seeking, maximization, minimization, or optimization process may or may not always guarantee convergence to an absolute solution. For example, an optimization process may exhaustively evaluate a solution space to ensure that the identified solution is the best available. Alternatively, an optimization process may employ heuristic or probabilistic techniques that provide a bounded confidence interval or other measure of the quality of a solution. For example, an optimization process may be designed to produce a solution that is within at least some percentage of an optimal solution, to produce a solution that has some bounded probability of being the optimal solution, or any suitable combination of these or other techniques.

Computer System Implementations

In some embodiments, any of the methods or techniques described above may be implemented as program instructions and data capable of being stored or conveyed via an article of manufacture including a computer-readable or -accessible medium. Such methods or techniques may include, for example and without limitation, the operations of planning system 220 described herein, as well as the techniques illustrated in FIGS. 4-6 and any suitable variations thereof. Such program instructions may be executed to perform a particular computational operation, such as inventory allocation and distribution, item or inventory selection, item or inventory quantity determination, cost analysis, inventory position analysis, order fulfillment management, operating system functionality, applications, and/or any other suitable operation.

Figure 7:
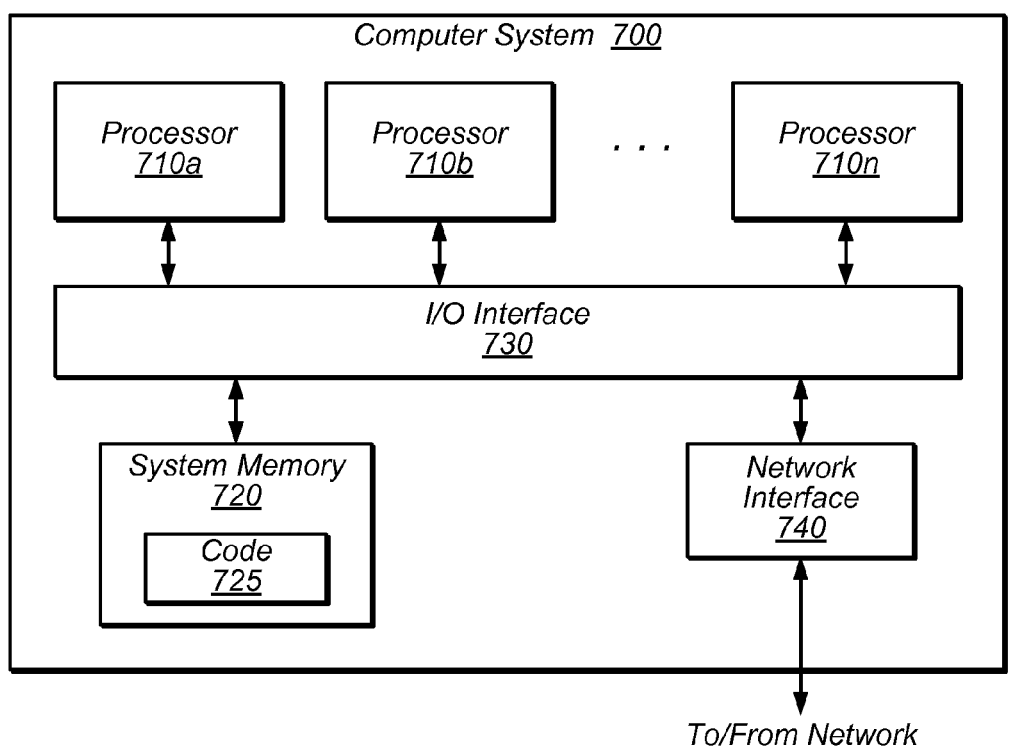
FIG. 7 is a block diagram illustrating a computer system configured to implement a planning system according to some embodiments.

An embodiment of a computer system including computer-accessible media is illustrated in FIG. 7. As illustrated, computer system 700 includes one or more processors 710 coupled to a system memory 720 via an input/output (I/O) interface 730. Computer system 700 further includes a network interface 740 coupled to I/O interface 730. In some embodiments, a system such as system 200 may be implemented using a single instance of computer system 700, while in other embodiments multiple such systems may be configured to host different portions or instances of system 200. For example, in one embodiment some data sources or services (e.g., planning system 220) may be implemented via instances of computer system 700 that are distinct from those instances implementing other data sources or services (e.g., order input system 210).

In various embodiments computer system 700 may be a single system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by process 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as code 725.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 720 may be one embodiment of a tangible computer-accessible or -readable medium configured to store program instructions and data as described above. However, in other embodiments, program instructions and/or data may be received, sent or stored upon different types of tangible computer-accessible or -readable media. Generally speaking, tangible computer-accessible or -readable media may include storage media or memory media such as magnetic or optical media, e.g., disk or CD/DVD-ROM coupled to computer system 700 via I/O interface 730. A tangible computer-accessible or -readable medium may also include any volatile or non-volatile media such as RAM (e.g., SDRAM, DDR SDRAM, RDRAM, SRAM, etc.), ROM, etc, that may be included in some embodiments of computer system 700 as system memory 720 or another type of memory. Program instructions and data stored via a tangible computer-accessible or -readable medium may be transmitted by transmission media or signals such as electrical, electromagnetic, or digital signals, which may be conveyed via a communication medium such as a network and/or a wireless link, such as may be implemented via network interface 740.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
performing, via one or more computers:
selecting items to be stored at a fulfillment center, wherein said selecting comprises:
identifying orders fulfilled by a fulfillment center during a previous time period, wherein each of the identified orders specifies one or more of a plurality of items, and wherein at least one of the identified orders specifies a plurality of distinct items;
determining, for each identified order, a probability that the identified order will occur in a subsequent time period;
calculating, for each identified order, a cost savings associated with fulfilling the identified order from the fulfillment center instead of another fulfillment center;
selecting a limited number of distinct items to be stored at the fulfillment center, wherein said selecting comprises selecting items among the plurality of items to be stored in the fulfillment center during at least a portion of the subsequent time period based, at least in part, upon the determined probability and cost savings of each identified order, wherein said selecting attempts to maximize the cost savings for the limited number of distinct items; and
for each of the selected items, calculating a target inventory level, wherein calculating the target inventory level comprises:
receiving a customer demand forecast corresponding to the selected item;
determining a bind factor for the selected item; and
calculating the target inventory level for the selected item to be stored in the fulfillment center based, at least in part, upon the customer demand forecast and the bind factor.

2. The method of claim 1, wherein the cost savings include a shipping cost savings.

3. The method of claim 1, wherein said selecting items among the plurality of items to be stored in the fulfillment center is performed independent of forecasted demand for the item.

4. The method of claim 1, wherein determining the probability further comprises:

grouping each identified order into one of a plurality of order groups, wherein each of the order groups specifies a different set of the plurality of items; and dividing a number of orders in a given order group by a total number of identified orders.

5. The method of claim 4, wherein selecting the items includes iteratively selecting one of the plurality of items at a time until the limited number of selected items is reached.

6. The method of claim 4, further comprising selecting a subsequent one of the plurality of items after having a selected a previous one of the plurality of items based, at least in part, upon an additional cost savings credit given to the subsequent item in response to the subsequent item being part of an order group that includes the previous item.

7. The method of claim 1, wherein the customer demand forecast is a probability distribution.

8. The method of claim 1, wherein the bind factor is a number between 0 and 1.

9. The method of claim 1, wherein determining the bind factor for the selected item further comprises dividing a number of units of the selected item shipped by the fulfillment center to a region assigned to the fulfillment center during the previous time period by a total number of units of the item stored in the fulfillment center during the previous time period.

10. The method of claim 1, wherein calculating the target inventory level further comprises multiplying the customer demand forecast by the bind factor.

11. A system, comprising:
at least one processor; and
a memory coupled to the at least one processor, wherein the memory stores program instructions, and wherein the program instructions are executable by the at least one processor to cause the system to select items to be stored at a fulfillment center, wherein to select items to be stored at a fulfillment center the program instructions are further executable to:
identify orders fulfilled by a fulfillment center during a previous time period, wherein each of the identified orders specifies one or more of a plurality of items, and wherein at least one of the identified orders specifies a plurality of distinct items that are ordered together;
determine, for each identified order, a probability that the identified order will occur in a subsequent time period;
calculate, for each identified order, a cost savings associated with fulfilling the identified order from the fulfillment center instead of another fulfillment center; and
select items among the plurality of items to be stored in the fulfillment center during at least a portion of the subsequent time period based, at least in part, upon the determined probability and cost savings of each identified order.

12. The system of claim 11, wherein the cost savings include a shipping cost savings.

13. The system of claim 11, wherein to determine the probability, the program instructions are further executable by the at least one processor to cause the system to:
group each identified order into one of a plurality of order groups, wherein each of the order groups specifies a different set of the plurality of items; and divide a number of orders in a given order group by a total number of identified orders.

14. The system of claim 13, wherein the program instructions are further executable by the at least one processor to cause the system to iteratively select one of the plurality of items at a time until a specified number of selected items is reached to attempt to maximize the cost savings for the specified number of items.

15. The system of claim 13, wherein the program instructions are further executable by the at least one processor to cause the system to select a subsequent one of the plurality of items after having a selected a previous one of the plurality of items based, at least in part, upon an additional cost saving credit given to the subsequent item in response to the subsequent item being part of an order group that includes the previous item.

16. A non-transitory computer-readable storage medium having program instructions stored thereon that, upon execution by a computer system, cause the computer system to:
calculate a target inventory level, wherein to calculate the target inventory level the program instructions further cause the computer system to:
identify an item to be stored in a fulfillment center, wherein the fulfillment center is configured to fulfill an order for the item within a given geographic region;
receive a customer demand forecast corresponding to the item;
determine a bind factor for the item, wherein to determine the bind factor the program instructions cause the computer system to estimate a historical bind factor that when applied to a target inventory level adjusts the target inventory level for past demand that was not fulfilled from the fulfillment center for an assigned region; and
calculate the target inventory level for the item based, at least in part, upon the customer demand forecast and the bind factor.

17. The non-transitory computer-readable storage medium of claim 16, wherein the customer demand forecast is a probability distribution, and wherein the bind factor is a number between 0 and 1.

18. The non-transitory computer-readable storage medium of claim 16, wherein the bind factor is determined based at least in part on historical order data.

19. The non-transitory computer-readable storage medium of claim 18, wherein to determine the bind factor, the program instructions, upon execution by the computer system, further cause the computer system to:
determine a number of units of the item that were shipped from the fulfillment center to a region assigned to the fulfillment center during a preceding time period;
determine a number of units of the item that were stored in the fulfillment center during the preceding time period; and
divide the number of shipped units by the number of stored units.

20. The non-transitory computer-readable storage medium of claim 16, wherein to calculate the target inventory level, the program instructions, upon execution by the computer system, further cause the computer system to calculate a product of the customer demand forecast with the bind factor.

* * * * *